United States Patent [19]
Bröde et al.

[11] Patent Number: 6,035,275
[45] Date of Patent: Mar. 7, 2000

[54] METHOD AND APPARATUS FOR EXECUTING A HUMAN-MACHINE DIALOGUE IN THE FORM OF TWO-SIDED SPEECH AS BASED ON A MODULAR DIALOGUE STRUCTURE

[75] Inventors: Holger W. Bröde; Olaf Schröer; Jens F. Marschner; Harald Aust; Enrique Marti Del Olmo, all of Aachen, Germany

[73] Assignee: U.S. Philips Corporation, New York, N.Y.

[21] Appl. No.: 09/005,626

[22] Filed: Jan. 9, 1998

[30] Foreign Application Priority Data

Jan. 9, 1997 [EP] European Pat. Off. ............. 97200050

[51] Int. Cl.[7] ....................................................... G10L 3/00
[52] U.S. Cl. ........................................... 704/275; 704/272
[58] Field of Search .................................... 704/270, 275, 704/200, 272

[56] References Cited

U.S. PATENT DOCUMENTS

| | | | |
|---|---|---|---|
| 5,357,596 | 10/1994 | Takebayashi et al. | 704/275 |
| 5,548,681 | 8/1996 | Gleaves et al. | 704/233 |
| 5,576,951 | 11/1996 | Lockwood | 705/27 |
| 5,671,329 | 9/1997 | Hatazaki | 704/253 |
| 5,694,558 | 12/1997 | Sparks et al. | 395/326 |
| 5,878,390 | 3/1999 | Kawai et al. | 704/231 |

OTHER PUBLICATIONS

Telecom Technology. Waterworth, Man–Machine speech 'dialogue acts'. vol. 1, No. 1, pp. 106–112, Jul. 1983.

"Man–Machine Speech Dialogue Acts", J.A. Waterworth, Br. Telecom Technology J. vol. 1, No. 1, Jul. 1983, pp. 106–112.

*Primary Examiner*—Richemond Dorvil

[57] ABSTRACT

In a dialogue structure outputting speech items interrogating an access call while examining subsequently received human speech items for ascertaining an actual transaction instance further outputting speech in accordance with the ascertaining until either attaining a positive transaction result, or otherwise exiting the dialogue in case of failure. In particular, the dialogue is constructed from hierarchically arranged and callable subdialogues constituting respective mutually independent building blocks, which are arranged for generating a particular outcome if a positive result is attained by the subdialogue in question. The subdialogues offer interfaces for mutual coupling with a hierarchically superior subdialogue, so that the overall structure is formed as based on a selection of subdialogues and exclusively based on required partial results by each of the subdialogues in the structure.

14 Claims, 2 Drawing Sheets

| Applications / Subdialogs | 1 | 2 | 3 | 4 | 5 | 6 | 7 | 8 | 9 | 10 | 11 | 12 |
|---|---|---|---|---|---|---|---|---|---|---|---|---|
| A  Product Information | | | | | | | | × | | × | | × |
| B  Company Call Router | | | | | × | | | | | | | |
| C  Shipment Info | × | × | | | | | | × | × | × | | × |
| D  Hotline | | | | | | | | × | | × | | |
| E  Phone Order Processing | × | × | × | | × | × | | × | × | × | × | × |
| F  Computel Ticket–Telephone | × | × | × | | × | × | | | × | × | × | |
| G  Tourist Information | | | | | | | × | | | × | | |
| H  Air Travel Information System | × | × | | | | | × | | | × | | |
| I  Railway Information System | × | × | | | | | × | | | × | | |
| J  Tele Banking | × | × | | × | | | | | × | × | × | |
| K  Yellow Pages | | | | | | × | | × | × | | × | |
| L  Directory Service | | | | | | × | × | | | × | | |

METHOD AND APPARATUS FOR EXECUTING A HUMAN-MACHINE DIALOGUE IN THE FORM OF TWO-SIDED SPEECH AS BASED ON A MODULAR DIALOGUE STRUCTURE

BACKGROUND OF THE INVENTION

The invention relates to a method as recited in the preamble of claim 1. Various systems have come into use that confront a human user with a machine that maintains a bidirectional speech channel, in that human speech is analyzed and understood, and riposted with machine-generated speech. The nature of the transaction can be economical, in that a physical item or a service is ordered by or rendered to a customer. Alternatively, the transaction can be an enquiry system such as relating to public transport facilities, weather forecast, etcetera. Still other types of transaction are feasible as well. Recognizing human speech remains a technically exacting problem, because the analysis itself is complicated, and also because the speech is itself often inconsistent on various different levels: words may be missing or superfluous, the actual phrase may be selfcontradictory or inconclusive, or a particular sentence may render another one meaningless. In consequence, the invention recognizes that such elements of a system which have proved to be working correctly should be considered as gold nuggets, and if possibly be reused for various other purposes.

SUMMARY TO THE INVENTION

In consequence, amongst other things it is an object to allow in dialogue developing, as well as in the use of a multi-dialogue system, as much as possible the reuse of proven building blocks, so that the overall structure can be tailored to a particular problem through an appropriate description of the system, whilst the construction of the structure is facilitated through the use of modular dialogues. It has been found that various different dialogues, or even different parts of a single dialogue intend to extract from a user informations that have identical or nearly identical character, and the reuse of subdialogues allows for an easier development, as it were, on the basis of building blocks.

Advantageously, all subdialogues at a non-top level of the hierarchy have a uniform interface for being accessible, said interface specifying an identifier, a fixed receivable entity, and a variable output entity for presentation to a higher level subdialogue. In this way, the internal communication between the various subdialogues can be structured in a standard and uniform manner, which again simplifies the developing or amending of a dialogue.

Advantageously, at least one subdialogue has two siblings arranged in parallel therein for undertaking to attain uniform output results, but using respectively various different procedures thereto. In this way, various adverse circumstances can be remedied by using a different recognition algorithm or a different structure of a particular subdialogue, if necessary. In case the circumstances change during execution of a particular subdialogue, or between respectively successive executions thereof, an optimum choice between available subdialogue siblings may be made.

The invention also relates to an apparatus for implementing the method.

Further advantageous aspects of the invention are recited in dependent claims.

BRIEF DESCRIPTION OF THE DRAWING

These and other aspects and advantages of the invention will be discussed more detail with reference to the disclosure of preferred embodiments hereinafter, and more in particular with reference to the appended Figures, that show.

DETAILED DESCRIPTION OF PREFERRED EMBODIMENTS

Hereinafter, first the general organization of the invention is described, in terms of overall hardware. Next, the internal organization with subdialogues and siblings is considered.

Figures 1, 3:
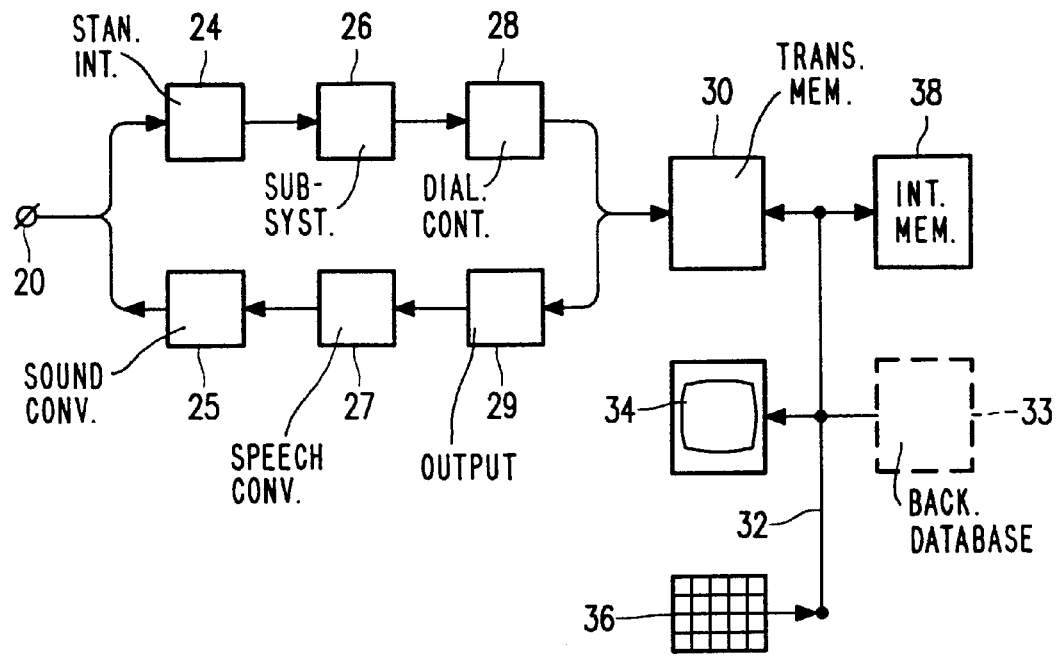
FIG. 1, an overall block diagram of an inventive system.
FIG. 3, a list of applications built from subdialogues.

FIG. 1 is an overall block diagram of a system according to the invention. Item 20 represents the interconnection to a public telephone. Block 24 represents a standard interface to this net, which for an analog net allows to receive and sample analog speech from the net. Block 26 is a subsystem for recognizing received speech. By itself, speech recognition has been disclosed in various documents, such as U.S. Ser. No. 07/860,199 (PHD 89158), U.S. Ser. No. 08/425,305 (PHD 91136), U.S. Ser. No. 08/312,495 (PHD 91137), U.S. patent application Ser. No. 08/563,853 (PHD 91138), U.S. Ser. No. 08/203,105 (PHD 93034), U.S. Ser. No. 08/587, 190, all to the assignee of the present application. Speech generation has been disclosed in various documents, such as U.S. Ser. No. 08/696,431 (PHN 15408), and U.S. Ser. No. 08/778,795 (PHN 15641), to the present assignee.

Block 28 is a dialogue control subsystem that undertakes to understand the speech entries received, given the intention of the speech entries to reach a particular transaction result, that should then be recorded in the transaction memory 30. Block 30 is a transaction memory which is organized to store parts of the request of the user as far as they have been recognized, as well as indications of what policy the machine is to follow next, in order to attain optimal progress, as far as clear. Also, the ultimate transactions may be recorded for subsequent execution. The nature of the transaction itself is not considered further. The storage format should be appropriate to the application. In an information system, the entry may specify the exact nature of the information required by the user person, so that after the full specification thereof has been found, the system may access a background database, and subsequently wipe out the information in memory 30.

Block 29 receives from the memory the information that should be outputted to the user, such as further questions and partial and final informations. In block 27 these are converted to a string of speech items, and in block 25 to actual sounds. In this manner the system outputs speech messages on interface 20 to elicit from a user such informations that are further necessary, so that a bidirectional speech dialogue with the user can be undertaken. Naturally, various blocks of the above comprise hardware as well as software components.

Block 36 is a user keyboard that may be standard alphanumerical, although special function keys for the particular application may be provided. This keyboard can be used by an operator for effecting various assistance and system management tasks. Block 34 is a standard display screen for showing the contents of a memory that keeps track of the execution of the user-intended task of the system. Item 32 is a local communication system interconnecting the items that can usually be directly controlled by the system operator. Item 38 is an intermediate memory for storing a certain amount of user speech for supporting improved processing thereof. Item 33 is the background database, or a connection to an ultimate service provider.

Figure 2:
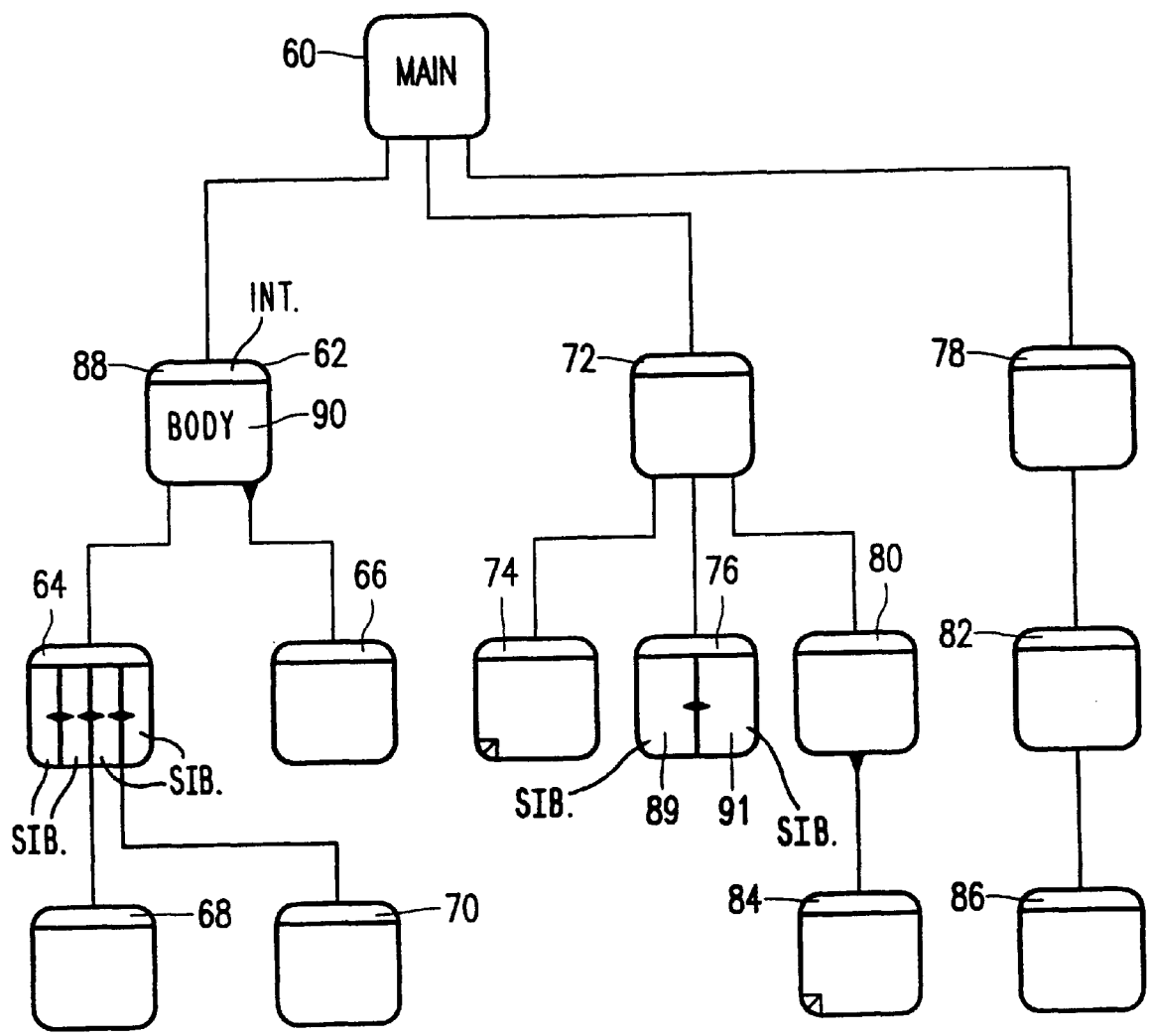
FIG. 2, a structure of a dialogue system.

FIG. 2 is an example of a dialogue system based on a hierarchical structure of individual subdialogues 60 to 86. First, there is a top subdialogue MAIN 60. On each of three hierarchically lower levels various further subdialogues are arranged. The precise functionality of the individual subdialogues is left unconsidered here for reasons of brevity. As shown, any subdialogue may have zero or more subdialogues connected thereto on a next lower hierarchical level. In principle, this number is unconstrained. As shown, subdialogue 62 has an interface 88 and a body 90. Except for main subdialogue 60, all other subdialogues have such an interface, that has a uniform structure explained elsewhere herein. Main subdialogue 60 is automatically accessed upon stating the application program, and therefore needs no particular interface. Upon starting the main subdialogue, one or more of directly connected subdialogues 62, 72, 78 may be accessed during the evolution of the dialogue. If two or more such subdialogues are simultaneously active, the time-sequential execution thereamongst may be arbitrary. This is also true if such simultaneously active subdialogues are on different levels in the hierarchy. A particular subdialogue may call one or more of its directly subaltern subdialogues immediately: in that case two or more instances of the latter subdialogue can be active. Upon accessing subdialogue 62, the subaltern subdialogue 66 is accessed immediately and automatically; which has been indicated by a special arrow at the bottom of subdialogue 62. A similar relation exists between subdialogues 80 and 84. Usually, all subdialogues are different from each other, which has not been indicated in any special manner. By way of exception, subdialogues 74 and 84 are identical to each other, which has been indicated by a special sign in the lower left hand corner. The usage of identical subdialogues in different positions in the hierarchy of course diminishes the required storage area, in that their physical presence needs only be singular.

Further, generally all subdialogues have internally a unitary setup. By way of exception, subdialogue 76 has internally two separate parts that are called siblings. Each of the siblings of a particular subdialogue is arranged to lead to an identical result if successful, be it in another manner. For example, part 89 may be able to recognize numbers when expressed as either forty eight or eight and forty. On the other hand, part 91 may recognize in particular sequences consisting exclusively of individual digits like: four-eight. If the recognition under control of sibling proceeds in an insufficient manner, the subdialogue in question may switch-over from one particular sibling pertaining to the subdialogue in question, to another sibling. Likewise, subdialogue 64 has four siblings. An example of use thereof may be the recognizing of an order for a stockbroker transaction: here, the recognition of the command buy versus sell is extremely relevant. However, in many languages these two terms resemble each other quite closely. In consequence, either upon sensing a potential problem if the recognition is feasible but not optimal, or alternatively even automatically, the system changes to the English version of a particular sibling after the version in another language has been recognized already. In certain situations, the provision of four siblings in parallel would be worthwhile.

FIG. 3 is a list of applications built from various subdialogues. The subdialogues are as follows.

1—date; this subdialogue provides to a user a unique date, whilst allowing to handle user input errors, such as nonexistent dates, and solving ambiguities, such as "Christmas" which in Europe may indicate a sequence of two or even of three (Germany) dates.

2—time; this provides a unique description of a time span.

3—credit card number; this provides a credit card number with repetition required.

4—account number; this provides an account number with repetition required.

5—name; this provides a name using recognition of continuous speech, single-word recognition, or letter spelling recognition, as depending on the state of progress of the subdialogue.

6—address; this provides a complete address, e.g. consisting of name, street, city and zip code. The subdialogue may be built through using as constituent parts dialogues #5 and #7.

7—city name; this provides a city name, using the recognition types specified under #5.

8—product name; this provides the generic name of a product, using the recognition types specified under #5.

9—caller identification; this provides all information that is necessary for unique identification of a caller. The subdialogue may be built using applications #4 and #5.

10—information output; this outputs required information to a caller person including optional repetition thereof.

11—amount of money; the result of this subdialogue is the specifying of an amount of money.

12—order number; this provides the outputting of an order number.

According to the mainstay of the present application, and also as commonly used, a subdialogue implies utterances from two sides. According to an extension of the invention, a particular module as shown in FIG. 2 may restrict to only give a machine speech output, while the remaining aspects of the module, such as the interface, are uniform with respect to the other modules. It is also feasible to have one or more modules that represent no visible effect at all to a user person. For brevity, all such modules will be called subdialogues hereinafter.

Next, the applications are as follows:

A—product information; this allows a caller person to enquire about certain specified properties of a particular product.

B—company call router; this allows to forward a telephone or other call type to a particular person or department, if the incoming call only partially specifies the destination.

C—shipment info; this allows for a caller to enquire about the status of a particular shipment, or for a system manager to enter or amend data pertaining to such shipment.

D—hotline; a special support facility for problems or specific access types.

E—phone order processing; this allows a caller person to place and specify an order for a particular product.

F—computel ticket-telephone; this allows for a caller person to place a telephone call in a computer-assisted application.

G—tourist information; this allows a caller person to specify a tourist information enquiry with regards to a particular aspect of the enquiry.

H—air travel information system; this allows a caller person to enquire about air travel destinations, routes, flight information, and prices.

I—railway information system; ditto for a rail interconnection system.

J—telebanking; this allows a caller person to order a limited selection of banking services that have become known as telebanking (such as: money transfers, payments, buying and selling of securities).

K—yellow pages; this allows a caller person to request information published in the so-called yellow pages of a telephone or similar directory.

L—directory service; this allows a caller person to request information from a telephone or similar directory, whilst using various different entry parameters, such as name, address, telephone number, etc.

FIG. 3, on each line that specifies a particular application, lists by means of a cross the subdialogues that can be used for building this application, for so facilitating this building by using modular subdialogues.

DIALOGUES, SUBDIALOGUES AND SIBLINGS

Hereinafter, first the conceptual aspects of the invention are discussed. Now, a particular application is constructed from subdialogues or HDDL modules, that together are linkable in a dialogue structure. Herein, HDDL is a High Level Dialogue Definition language. A dialogue can use through calling other dialogues, which by virtue of their capability are named subdialogues. In this manner, certain activities or services which are part of the overall service, can be encapsulated in the dialogue structure. By way of example, a home banking application usually needs to know the PIN number of a particular customer. Suppose now, that the system experiences a recognition problem while running this part of the dialogue, Now according to the invention, the system can call within the same subdialogue instead of the version or sibling presently used, another version or sibling in order to better understand the actual caller. According to one embodiment, the new sibling may repeat or mirror the original one, while the recognition is executed in a more exact manner. In another embodiment, the machine speech output to the user is made slower. In a third embodiment, the subdialogue introduces additional words or sentences that were not present in the original version, to render the subdialogue more clear. Such an additional expression may represent an example being given to a an unexperienced user person. Here, encapsulation means that the functionality of the subdialogue remains the same, but only the actual implementation changes. The above sibling concept allows the designer to implement the same dialogue functionality in respective different manners, whilst maintaining or not maintaining identical speech output to human users. The envisaged result is uniform across the various siblings. A dialogue without a plurality of siblings is in a semantic sense a dialogue with only a single sibling. Note that the top level dialogue does not have the sibling feature in the embodiment considered.

Subdialogues will be formulated hereinafter in pseudocode, and declared in the form of header, body and tail, such as by:

```
//header
DIALOGUE topLevelDialog( )SIBLING: small, normal;ELDEST normal
:
: //body
:
SIBLING small
    :
    END SIBLING small;
    SIBLING normal;
    :
    END SIBLING normal;
://tail
END DIALOGUE topLevelDialog
```

Second example:

```
// subdialogue
    DIALOGUE testDialogA( Boolean flag, Integer& result )
:
    :       //empty
:
END DIALOGUE testDialogA.
```

In the above, the second line starting with DIALOGUE represents the interface that is substantially uniform across the various subdialogues: the subdialogues are called by name, and in this case, the parameters given in the same line represent the interface. The parameter values may be presented to the subdialogue. Alternatively, the subdialogue may produce these parameter values for inputting into the interface. In this particular example, the Boolean is exclusively inputted. The integer& result quantity may be changed in relation to the user person.

The identifier in the header specifies the name of the subdialogue, and is identical to the name specified in the tail. The keyword MAIN marks the interface-less main subdialogue of the structure that is called at startup of the application, every application having exactly one main subdialogue, without argument list. An arbitrary number of further subdialogues is allowed. Where the subdialogue body can be replaced by one or more siblings, the sibling names are declared in the header of the subdialogue after the keyword SIBLING. One of the siblings per subdialogue is the standard implementation, that is used if a subdialogue call does not specify a particular sibling. The name of the standard sibling follows after the word 'eldest'. All other concepts, such as main subdialogue, formal arguments, are analogous in their meaning relative to subdialogues without siblings. Note that a sibling in its turn can be divided into sections.

TRANSACTION SECTION

This section allows a programming interface to the external world, which is everything external to the block featured in FIG. 1, using a class declaration. After a transaction class has been defined in the object-oriented HDDL program, objects of this type or class can be defined, but then these objects must appear in the actual section. In the disclosure hereinafter, terms followed by the word class define the type of an object, the terms followed by the word instance define the instance.

```
TRANSACTIONS
    TravelplanClass myTravelplanInstance;
    TravelplanClass our TravelplanInstance EXPORT;
    Price List globalPrice List IMPORT;
END TRANSACTIONS;
```

When the subdialogue goes in the ACTIVE mode, for each declared instance the class name is passed to the system in FIG. 1, to create an appropriate transaction object. The object is destroyed by the system when the subdialogue is subsequently deactivated.

```
CLASS MyClass
{
        init( );
        set( STRING in );
        get( STRING& out);
}
```

An identifier, for example MyClass, in the method declaration defines the name of a transaction method. Next follows a parameter list that declares the parameters of the transaction class method, restricting to the basic types boolean, integer, float, and string. They are mapped on appropriate C++ types. When the method of a transaction class is invoked, the associated HDDL parameter values are passed to the system transaction server by using formal argument names, which means that formal parameter names must be specified. The item & hereabove in the formal method argument has a similar meaning to a reference parameter creation in C++. If the element & is not included, the value of the associated parameter is passed while using default call-by-value. If however, & is declared, the value is passed as call-by-reference parameter. The latter is a variable parameter, it that it is used to provide a results value.

The definition of a transaction object can be extended by a keyword EXPORT. The so defined object can be used in another subdialogue. If the object is extended by a keyword IMPORT, the system does not create a new object. Instead, the class name refers to the object of the same name as defined in the corresponding EXPORT definition. The transaction statement is also described in the ACTION section hereinafter. The various instances may be used to call the various METHODS (unit, set, get).

CONTROLLING SUBDIALOGUES

The HDDL language includes a number of statements for the using and controlling of subdialogues. These statements are used for:

A. setting the subdialogue mode
B. terminating subdialogues
C. switching between siblings
D. calling/activating subdialogues In order to make a subdialogue visible, it must be either called or activated. Both of these actions are part of the parent subdialogue. An ACTIVATE statement may occur in a so-called condaction, that is a conditional action for activating a subdialogue, of the parent dialogue or in its USES section. A CALL statement may occur only in a condaction. A LISTEN statement is used to set a subdialogue in a listening mode. It can occur in the USES section or within a condaction of the parent subdialogue. The ACTIVATE and LISTEN statements can be used to specify a particular sibling. It is possible to define an initial mode for a subdialogue immediately when the associated parent is activated.

Activating a subdialogue

To switch on both the speech understanding and also the dialogue control sections of a subdialogue, the latter must first be activated with an ACTIVATE statement. In the listening mode, only the speech understanding section is activated, the dialogue control section then being inactive. The activating can be done with or without an actual argument list:

```
ACTIVATE DialogA siblingName(actual argument list);
        //or
        ACTIVATE DialogA;
```

Absence of all parameter values causes empty brackets. If the subdialogue is already listening or active, and the ACTIVATE statement is used with an argument list, the subdialogue in question is first deactivated and then activated again with the new parameters. As a result, the subdialogue looses its current internal state. When the subdialogue is already in listening mode, the variant 'without argument' may be chosen. The subdialogue is then 'promoted' from listening mode to active mode. As a result, its condactions become visible, and the variables of a sibling keep their actual values, unless a different sibling from the listening one is specified explicitly. If the first variant of the ACTIVATE statement is chosen, and no sibling is specified, the ELDEST sibling of the subdialogue will be reactivated. If a particular sibling is specified however, the latter is reactivated instead. However, if the subdialogue in question is already in active mode, and the 'without argument list' variant is chosen whilst specifying a particular sibling, or if the sibling in question is running already, the subdialogue maintains its internal state. When the next executable condaction is determined according to the HDDL evaluation strategy, the condactions of the latter subdialogue describing that strategy, and of its currently active siblings have the highest 'textual order', as if the subdialogues had just been activated. Various subdialogues can be active coexistently; their sequence order of execution is generally of little importance only, unless a conflict would occur.

Conversely, if the 'without argument list' variant is chosen that specifies a different sibling from the running sibling, the subdialogue switches to the former one, according to the Switch Statement hereinafter. If no sibling is specified, and the subdialogue was previously inactive, the ELDEST sibling is activated.

Calling a subdialogue

When activating a subdialogue, a variable defined in a condaction may not be passed as a reference parameter. When a subdialogue is called, it goes into active mode. Unlike switching on through the ACTIVATE statement, a new scope of the application is defined.

```
CALL DialogA:siblingName(argument list);
        CALL DialogA:siblingName;
```

The CALL statement activates the speech understanding and dialogue control parts of the called subdialogue, and all its siblings according to their initial mode specified in the USES section.

```
USES
        //...
        DialogA dialogInstance_4( origin, TRUE ) : ACTIVATE;
            :
        //...
END USES;
```

Here, again the name and the associated instance are specified in the interface. This means, that for a given call-scope, all data of the called subdialogue and of the siblings thereof activated subsequently, and also, if applicable, their listening subdialogues, become visible. Other subdialogues, in particular the parent subdialogue, become invisible after the call. When the called scope terminates, the previous scope is restored, and the next statement after the CALL statement is executed.

Setting to listening mode

The LISTEN statement sets the specified subdialogue to listening mode.

---

LISTEN DialogA( )
//or
LISTEN DialogA:siblingName( );
//or
LISTEN DialogA;

---

The requirements to a LISTEN statement differ, depending on the previous mode of the subdialogue specified:

I. if the subdialogue is inactive, the statement sets it to listening mode, subsequently all subdialogues specified in the USES section that have the initial mode LISTEN or ACTIVE are set to listening mode;

II. if the subdialogue was already listening, the statement only affects a sibling that is specified other than the one currently running III. if the subdialogue was active, it is reset to listening mode. If the same sibling is used, all its currently active subdialogues are also set to listening mode.

Deactivating a subdialogue

The DEACTIVATE statement sets the mode of the subdialogue, together with all of its siblings, to inactive mode:

DEACTIVATE DialogA;

If a dialogue is set to passive mode from either active or listening mode, all its subdialogues are also set to passive mode. Since the default mode of a subdialogue is passive, the DEACTIVATE keyword need not to be used within the USES section of a dialogue.

Terminating a subdialogue

Once a subdialogue has been called, it may terminate in four different ways:

I. through the RETURN statement in the subdialogue

II. through an 'implicit return', which occurs when no condactions in the current dynamic scope can be executed, because every condition then evaluates to FALSE III. deactivation via the parent subdialogue IV. with a BYE statement, that terminates the entire application; the latter two implying the implicit return, supra.

Switching subdialogues

The SWITCH statement is used to switch a subdialogue to one of its siblings:

SWITCH SiblingA;

Here, the current implementation of the subdialogue is replaced in full by the implementation defined in the specified sibling (here: SiblingA). Other subdialogues in the current scope are also affected, since the subdialogues which were activated by the switching subdialogue are (recursively) deactivated. This particular procedure is fully dependable, since both implementations share the same interface, which is the only component that is visible to other subdialogues. This means that if the switching subdialogue was activated, or called by another subdialogue, subsequent to the switch no change will have been effected for the activating or calling subdialogue.

Problem detection

In an HDDL application the problem detector mechanism allows the program to monitor the progress of a subdialogue. Through using the results gained from the monitoring, problem detection allows the program to decide whether or not to adjust the flow of the dialogue according to the current situation. The monitoring of the dialogue is achieved by checking certain aspects of the system behavior, and reflecting this behavior as a structured system value. An example is the number of repetitions for a particular question. This value is then made available to the HDDL program at any subsequent instant in the dialogue flow.

Switching siblings

An associated 'switchover' mechanism allows entire dialogues to be switched In and Out upon recognizing a problem. This mechanism uses subdialogue siblings as its objects, several implementations of which may be provided for one particular subdialogue, each exhibiting a respectively different behavior. This mechanism creates a facility for reacting to any deterioration in the dialogue flow. For example, various different siblings can be used with a good quality dialogue, a rather poor dialogue, and a bad quality dialogue, respectively. As speech understanding deteriorates, a subdialogue can then switch itself to a version that can deal with poor speech understanding, wherein for instance the user may be asked to spell out the intended phraseology. If the dialogue improves again, the subdialogue in question may switch itself back to the higher quality version for better understanding. This switching can only be effected by the dialogue itself, based on required partial results by each of the subdialogues in the structure.

We claim:

1. A method for in a transaction environment executing a machine-controlled human-machine dialogue, said method comprising the steps of:

receiving an access call;

interrogating said access call in a dialogue structure by means of outputted speech items whilst examining subsequently received human speech items for ascertaining an actual transaction instance;

generating said outputted speech items in accordance with said ascertaining until either attaining a positive transaction result, or otherwise exiting the dialogue in case of failure; and wherein said dialogue is constructed from callable subdialogues which constitute respective mutually independent building blocks wherein said subdialogues are stored in a hierarchy arrangement for generating a particular outcome if a positive result is attained by the subdialogue in question, wherein said subdialogues offer interfaces for mutual coupling with a hierarchically superior subdialogue, so that the overall structure is formed as based on a selection of subdialogues and exclusively based on required partial results by each of the subdialogues in the structure.

2. A method as claimed in claim 1, wherein all subdialogues at a non-top level of the hierarchy have a uniform interface for being accessible, said interface specifying an identifier, a fixed receivable entity, and a variable output entity for presentation to a higher level subdialogue.

3. A method as claimed in claims 1, wherein at least one subdialogue has two siblings arranged in parallel therein for undertaking to attain uniform output results, but using respectively various different procedures thereto.

4. A method as claimed in claim 3, further comprising the step of allowing immediate switchover between respective different siblings pertaining to a single subdialogue.

5. A method as claimed in claim 1, wherein a top level subdialogue is accessed immediately from an application pertaining to the dialogue structure in question.

6. A method as claimed in claim 1, wherein at least one extra quasi-subdialogue has been introduced into the structure that interfaces in corresponding manner, but does not provide machine-speech output.

7. A method as claimed in claim 1, wherein at least one subdialogue is identically arranged at more than one position in the structure.

8. A method as claimed in claim 1, wherein at least one subdialogue allows to process one subaltern subdialogue thereto in more than one instance.

9. A method as claimed in claim 1, further comprising the step of allowing coexistent activation of a plurality of instances of the same subdialogue.

10. An apparatus arranged for in a transaction environment executing a machine-controlled human-machine dialogue, said apparatus comprising:

input means for receiving an access call;

bidirectional speech channel means for interrogating said access call in a dialogue structure by means of outputted speech items, examining means for examining received human speech items for ascertaining an actual transaction instance; and output means for outputting speech items in accordance with said ascertaining until either attaining a positive transaction result, or otherwise exciting the dialogue in case of failure, storage means for storing various subdialogues in a hierarchical arrangement structure, constructing said dialogue from hierarchically arranged and callable subdialogues which constitute respective mutually independent building blocks arranged for generating a particular outcome if a positive result is attained by the subdialogue in question, wherein the subdialogues offer interfaces for mutual coupling with a hierarchically superior subdialogue, so that the overall structure is formed as based on a selection of subdialogues and exclusively based on required partial results by each of the subdialogues in the structure.

11. An apparatus as claimed in claim 10, wherein all subdialogues at a non-top level of the hierarchy have a uniform interface for being accessible, said interface specifying an identifier, a fixed receivable entity, and a variable output entity for presentation to a higher level subdialogue.

12. An apparatus as claimed in claim 10, wherein at least one subdialogue has two siblings stored in parallel therein for undertaking to attain uniform output results, but using respectively different procedures thereto.

13. An apparatus as claimed in claim 12, and having detection means for detecting a request for immediate switchover between respective different siblings pertaining to a single subdialogue.

14. An apparatus as claimed in claim 10, wherein a top level subdialogue is accessed immediately from an application pertaining to the dialogue structure in question.

* * * * *